(12) United States Patent
Ferrari

(10) Patent No.: US 6,971,684 B2
(45) Date of Patent: Dec. 6, 2005

(54) FAST COUPLING FOR IRRIGATION SYSTEMS, PARTICULARLY DOMESTIC IRRIGATION SYSTEMS

(75) Inventor: Ruggero Ferrari, Parma (IT)

(73) Assignee: Ferrari Group Srl, (IT)

( * ) Notice: Subject to any disclaimer, the term of this patent is extended or adjusted under 35 U.S.C. 154(b) by 90 days.

(21) Appl. No.: 10/461,759

(22) Filed: Jun. 13, 2003

(65) Prior Publication Data

US 2004/0108716 A1    Jun. 10, 2004

(30) Foreign Application Priority Data

Jun. 24, 2002   (IT)   ........................... PR2002A0036

(51) Int. Cl.⁷ ............................................... F16L 37/00
(52) U.S. Cl. ..................... 285/319; 285/317; 285/331; 285/921; 285/33
(58) Field of Search .................. 285/5, 24, 27, 285/33, 317, 319, 331, 921, 148.1, 148.2

(56) References Cited

U.S. PATENT DOCUMENTS

| | | | | |
|---|---|---|---|---|
| 1,845,882 A | * | 2/1932 | Litschge | 285/361 |
| 2,327,611 A | * | 8/1943 | Schelwer | 285/316 |
| 2,768,845 A | * | 10/1956 | Samiran | 285/331 |
| 3,202,442 A | * | 8/1965 | Abbey et al. | 285/3 |
| 3,684,321 A | * | 8/1972 | Hundhausen et al. | 285/316 |
| 3,873,062 A | * | 3/1975 | Johnson et al. | 251/149.6 |
| 4,026,581 A | * | 5/1977 | Pasbrig | 285/24 |
| 4,660,803 A | * | 4/1987 | Johnston et al. | 251/149.1 |
| 4,678,210 A | * | 7/1987 | Balsells | 285/318 |
| 4,790,567 A | * | 12/1988 | Kawano et al. | 285/24 |
| 5,015,374 A | * | 5/1991 | Mathieu et al. | 210/232 |
| 5,078,429 A | * | 1/1992 | Braut et al. | 285/4 |
| 5,171,045 A | * | 12/1992 | Pasbrig | 285/308 |
| 5,219,188 A | * | 6/1993 | Abe et al. | 285/93 |
| 5,228,724 A | * | 7/1993 | Godeau | 285/93 |
| 5,797,626 A | * | 8/1998 | Ruggero | 285/5 |
| 6,199,913 B1 | * | 3/2001 | Wang | 285/24 |
| 2002/0180210 A1 | * | 12/2002 | Martin-Cocher et al. | 285/308 |

FOREIGN PATENT DOCUMENTS

CH    677964 A5  *  7/1991  ........... F16L 37/04

* cited by examiner

Primary Examiner—James M. Hewitt
(74) Attorney, Agent, or Firm—Shlesinger & Fitzsimmons

(57) ABSTRACT

The invention relates to fast couplings for connecting hoses, particularly for domestic irrigation. A fast coupling is formed by a first body and a second body reciprocally connected by inserting first lugs projecting from the second body in first slots made on the first body. A male connector is locked inside the fast coupling by radially pressing an end of the male connector with a torus-shaped elastic element. Unlocking the second body from the first body causes the automatic ejection of the mail connector.

9 Claims, 3 Drawing Sheets

FAST COUPLING FOR IRRIGATION SYSTEMS, PARTICULARLY DOMESTIC IRRIGATION SYSTEMS This application claims benefit under 35 U.S.C. §119 of Italian Application No. PR2002A000036, filed Jun. 24, 2002.

FIELD OF THE INVENTION

The subject matter of the present invention is a fast coupling for irrigation systems, particularly domestic irrigation systems.

BACKGROUND OF THE INVENTION

Couplings adapted to connect two hoses or temporarily connect domestic-type irrigation elements for gardens and kitchen gardens are already known and have been manufactured. Designers have always tried to combine practicality and low manufacturing cost in these couplings, these characteristic are deemed critical in order to sell as many couplings as possible.

Prior art couplings are capable to meet design goals, however at the expense of a rather complex structure; particularly, this complexity regards both the number of components, sometimes considerable, and the same inventive idea which shows some drawbacks regarding the usability when it is put into practice Document U.S. Pat. No. 5,797,626 describes a fast coupling between two hoses wherein a male connector is connected to a central body by radially buckling an elastic element upon pressing said connector along the longitudinal axis, said male connector being previously completely inserted in the elastic element.

The number of components making up said coupling is so great that there are two drawbacks: high cost and recurrent failures.

SUMMARY OF THE INVENTION

A first object of the present invention is a fast coupling made up by few components.

Another object is a coupling showing a better practicality than known couplings.

Particularly, the fast coupling for connecting two hoses, specifically intended to be used for domestic irrigation, comprising: at least one body adapted to be connected to a male connector, characterized by the fact that the coupling comprises:

a first inner body and second outer body coaxial with respect to each other, the first and second bodies being partially slidable with respect to each other along a common longitudinal axis; said first and second bodies being hollow along said longitudinal axis and being detachably locked together via reciprocally cooperative connecting and disconnecting means; said second body being adapted to be connected to the male connector;

an elastic torus-shaped element housed inside the second body, said elastic element being adapted to lock said male connector;

an elastic compression element longitudinally located between said first and second bodies; said elastic compression element being adapted both to instantaneously disconnect the male connector from the second body and easily release the first body from said second body;

said first and second body being detachably locked when the fast coupling is in an operative state.

BRIEF DESCRIPTION OF THE DRAWINGS

These and other characteristics will be better understood by the following description of a preferred embodiment of the present invention shown in an illustrative and non-limiting way in the drawings, wherein.

DETAILED DESCRIPTION OF THE INVENTION

Figure 1:
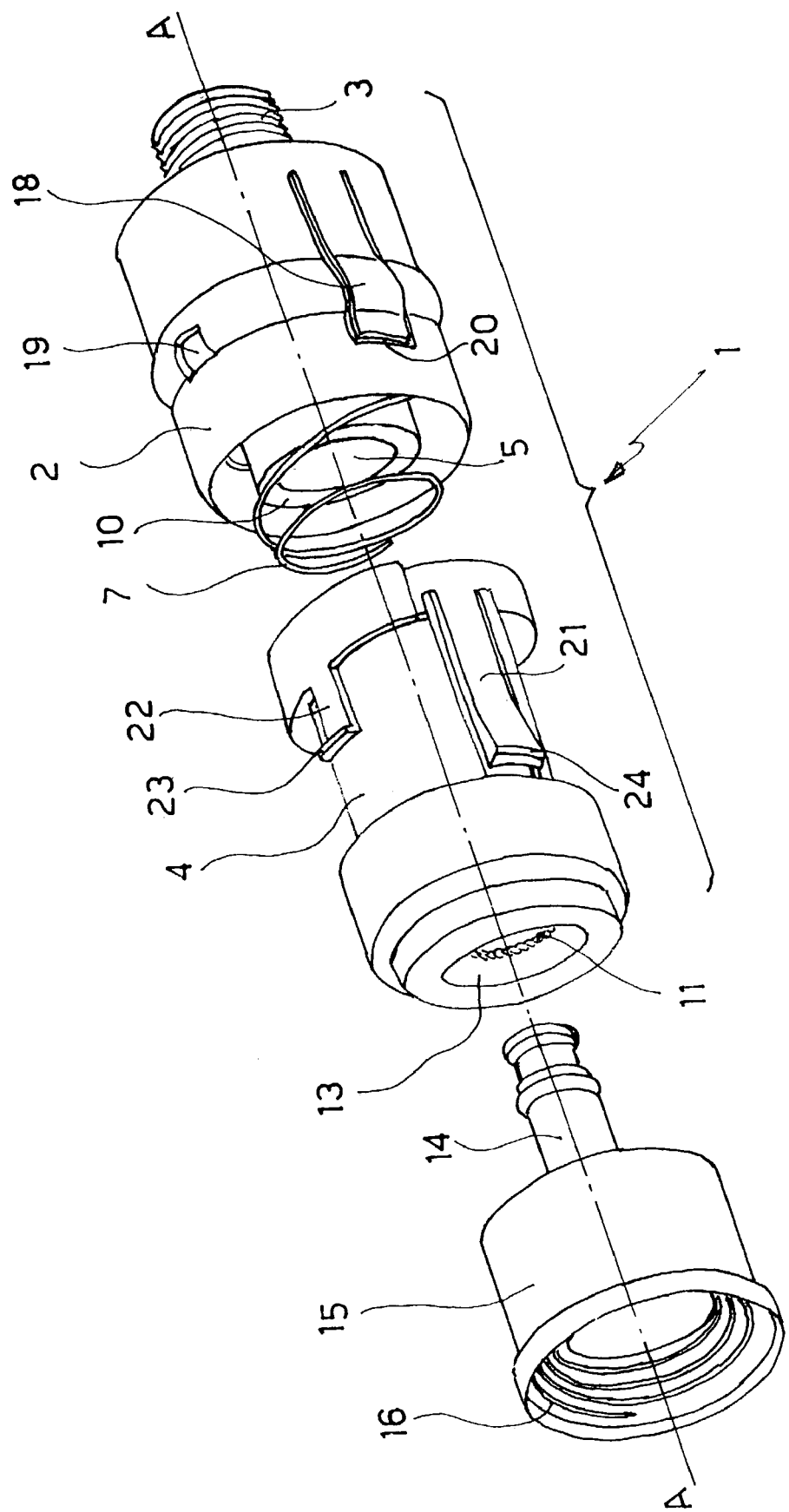
FIG. 1 is a prospective exploded view of elements making up the fast coupling with a male connector.
Figure 2:
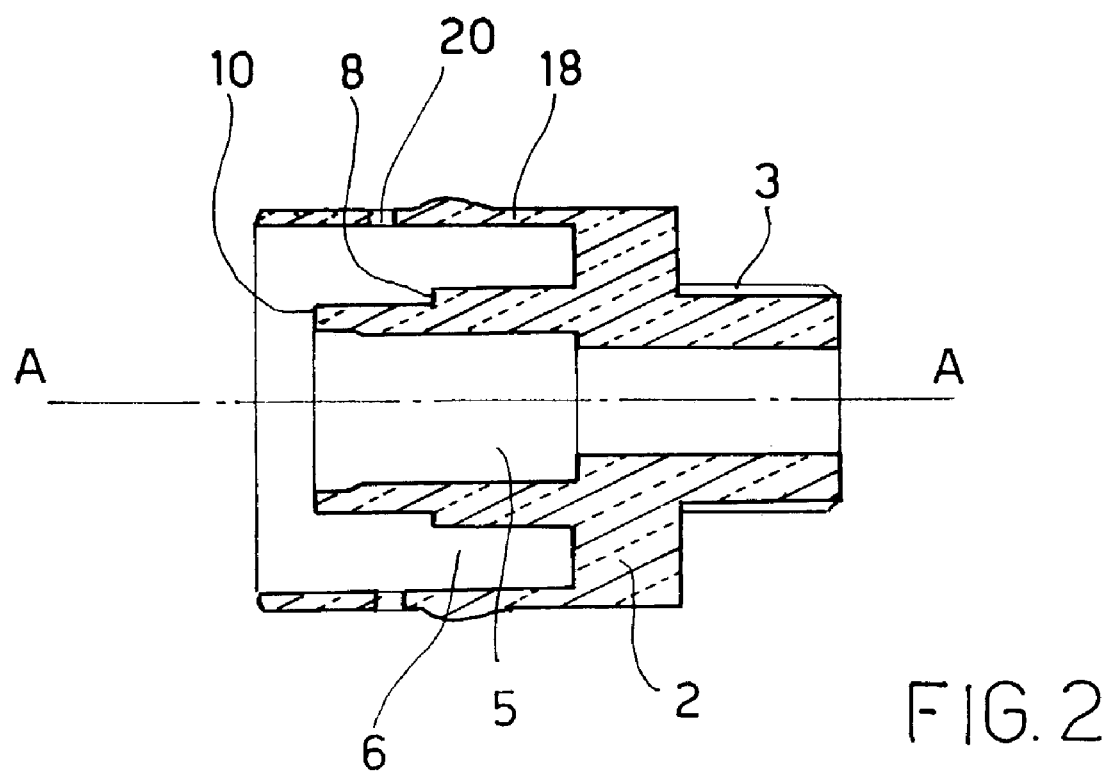
FIG. 2 is a section of the first body of the fast coupling.
Figure 3:
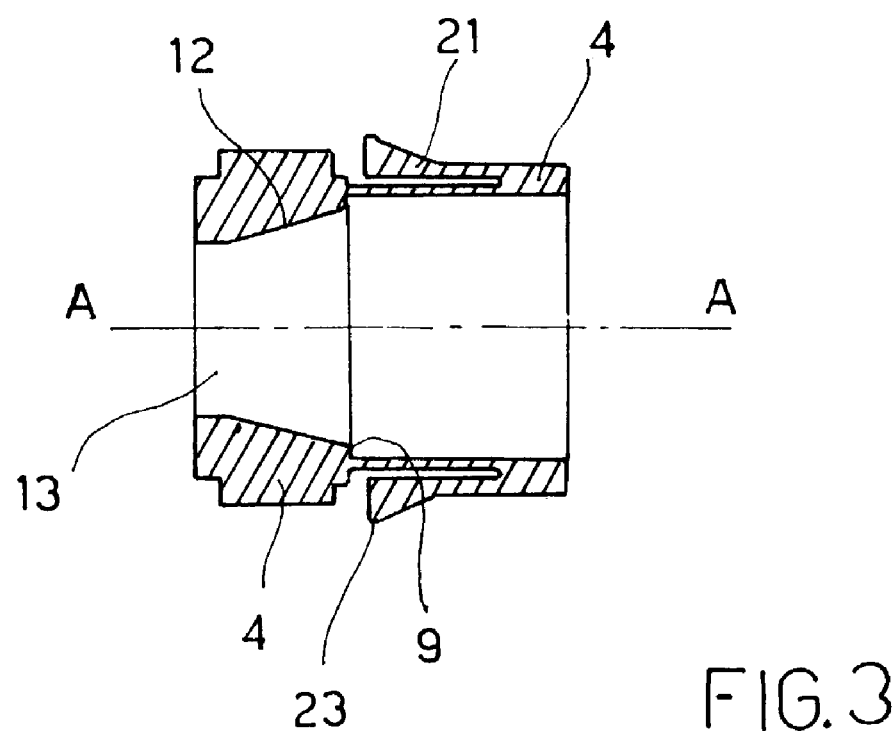
FIG. 3 is a section of the second body of the fast coupling.

Referring to figures, 1 shows a fast coupling made up by a first body 2 adapted to be connected, by its first thread 3, to a first hose not shown, and a second body 4; both said bodies being substantially cylindrical, coaxial to each other, the second body being insertable in the first body.

Both bodies are hollow along a longitudinal axis of symmetry A—A, an inner cavity in the body 1 being adapted to receive a water flow being shown at 5. Second body 4 partially slides into first body 2 along axis A—A.

A circumferential housing 6 is defined inside first body 2. A first end of a cylindrical compression spring 7 abuts a first step 8 inside first body 2, a second end abuts a second step 9 inside second body 2.

First body 2 is provided with an inner circumferential shoulder 10 defined between circumferential housing 6 and inner cavity 5. A torus-shaped spring 11 is received inside second body 4, particularly inside its inner portion 12 that is hemispherical in the cross-section and shrinks towards second body end, said end being provided with an opening 13 symmetrical to axis A—A.

Said opening 13 is shaped to fit to the outer profile of an end 14 of a male connector 15 designed to be connected to a second hose, not shown, by a second thread 16.

Figure 4:
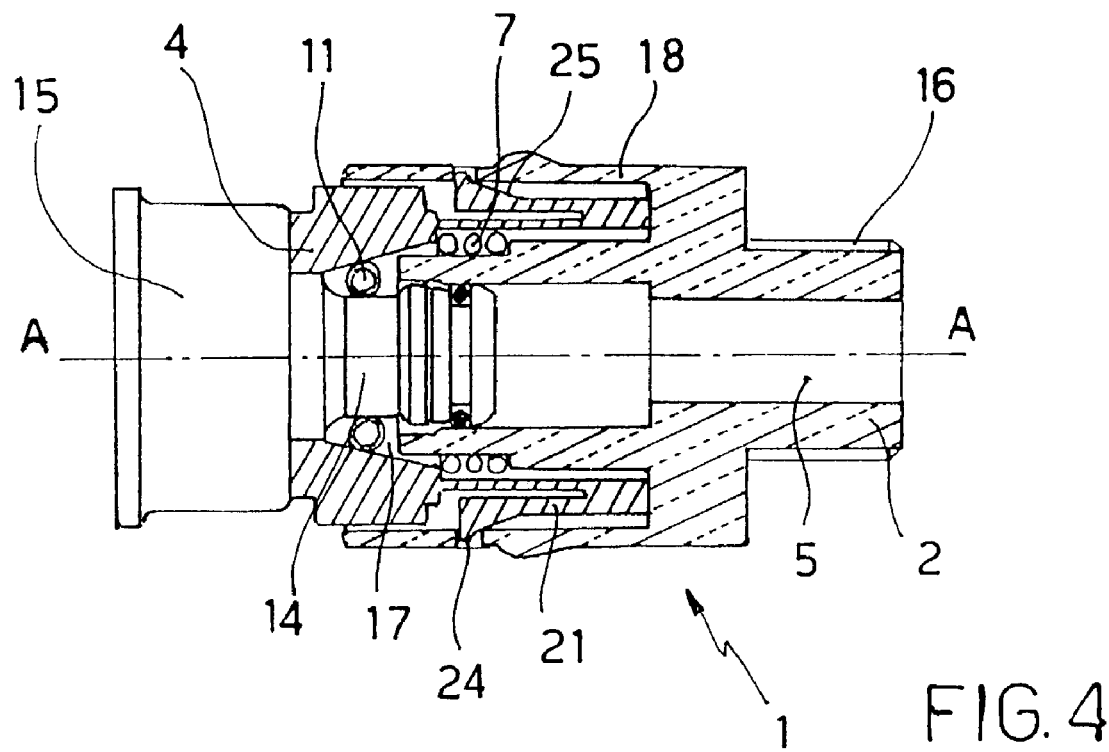
FIG. 4 is a section view of the fast coupling connected to the male connector.
Figure 5:
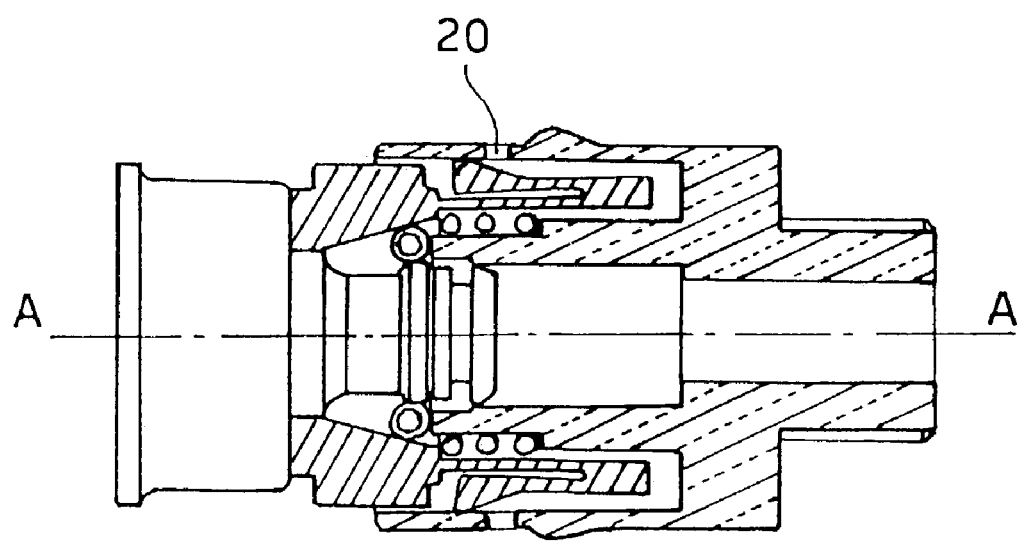
FIG. 5 is the same view of FIG. 4 except for the male connector is disconnected from the fast coupling.

As specifically shown in FIGS. 4 and 5 illustrating the fast coupling 1, torus-shaped spring 11 is located inside a housing 17 defined by the inner part 12, the circumferential shoulder 10 and the outer surface of end 14.

The outer circumference of first body 2 is provided with two first flexible elements 18 and two first slots 19; each first slots being in between said two first flexible elements. Said first flexible elements are made by cutting the circumferential surface of first body 2, two second slots 20 are simultaneously cut in the two first flexible elements 18 respectively.

Second body 4 is provided along its outer circumference with second flexible elements 21 and two third flexible elements 22; each third flexible elements being in between said two second flexible elements. Each said second flexible elements and each said third flexible elements are provided with a first lug 23 and a second lug 24 respectively, both lugs facing radially outwardly from the second body.

The width of two first lugs 23 is scarcely less than the width of the two slots 19, while second lugs 24 are shaped so that they can cooperate with two slots 20.

The outer surface of each second flexible elements 21 have a portion 25 shaped as an inclined plane.

The operation of the device of the present invention will be described in the following referring to the numbers in the figures.

The user grasps first body 2 and inserts end 14 of male connector 15 in opening 13 until the latter abuts second body 4. Then the user keeps pushing the male connector against second body 4 so that the latter slides inside the first body 2 along the longitudinal axis A—A; during this step, the top of lugs 24 slides along the inner surface of first body 2 compressing cylindrical spring 7.

The sliding step is carried on until first lugs 2 enter second slots 20 by a snap due to flexibility of second elements 21 and perceived by the user; said insertion prevents second body from disconnecting.

Said sliding step makes torus-shaped spring 11 to shrink radially because circumferential shoulder 10 pushes it toward the smaller portion of hemispherical housing 17, in this way torus-shaped spring is clamped on the outer surface of end 14 of male connector 15 which in turn is fastened to fast coupling 1.

When user wants to disconnect male connector 15 from fast coupling 1, he/she can do that using just one hand; indeed after having grasped first body 2, he/she presses first flexible elements 18 with the same hand, said pressure causes the inner surface of said first elements to press portion 25 of second flexible elements 21 which in turn are lowered releasing lugs from respective second slots 20. Cylindrical spring 7 instantaneously moves second body 4 away from first body 2, so that torus-shaped spring 11 can radially expand because it is contained in the portion of inner space 12 having the largest diameter and releases its radial pressure on male connector 15. The snap of cylindrical spring 7 automatically drives out said male connector from the second body 4.

Therefore elements 18, 20, 21, and 24 form connecting and releasing means.

It is to be noted that when the user introduces male connector 15 in the opening 13, the first and second body forming the fast coupling 1 are already reciprocally connected, as shown in FIGS. 4 and 5, said connection being established before the use of said fast coupling by the insertion of lugs 23 in first slots 19. Said insertion is made in the following way: when the first body 2 and second body 4 are to be connected, second body 4 is pushed inside first body 2 until third flexible elements 22 come at first slots 19 so that the lugs 23 enter said slots; now the two bodies are connected to each other so that one of the bodies can slide with respect to the other by an amount equal to the length of slots 19.

The two bodies can be disconnected by pressing simultaneously the two third flexible elements 22 using a sharp tool capable of penetrating inside first slots 19; said step which is necessary to disconnect second lugs 23 from first slots 19 is a safety feature which makes almost impossible an unintentional disconnection of said first and second body during the use of fast coupling 1.

A first advantage of the fast coupling of the present invention consists in that it is made up by few components, in this way the manufacturing cost, the possibility of breaks and failure are kept low during the use of fast coupling 1.

Another advantage is that the simplicity and practicality of use are improved in fact the male connector 15 can be disconnected effortlessly from the fast coupling of the present invention by just one hand so that the other hand can be used for other operations.

What is claimed is:

1. In an irrigation system fast coupling for connecting two hoses, comprising:

a first inner body and second outer body coaxial with respect to each other, the first and second bodies being partially slidable with respect to each other along a common longitudinal axis; said first and second bodies being hollow along said longitudinal axis and being detachably locked together via reciprocally cooperative connecting and disconnecting means; said second body being adapted to be connected to a male connector;

an elastic torus-shaped element housed inside the second body, said elastic element being adapted to lock said male connector;

an elastic compression element longitudinally located between said first and second bodies; said elastic compression element being adapted both to instantaneously disconnect the male connector from the second body and easily release the first body from said second body;

said first and second bodies being detachably locked when the fast coupling is in an operative state.

2. The fast coupling according to claim 1, wherein the first body is provided, along its outer circumference, with two first flexible elements and two first slots, each of the first slots being in between said two first flexible elements; said first flexible elements being adapted to be pressed by a user.

3. The fast coupling according to claim 2, wherein the second body is provided, along its outer circumference, with two second flexible elements and two third flexible elements, each of said third flexible elements being in between said two second flexible elements; each of said second flexible elements being adapted to cooperate with one of said first flexible elements; each of said third flexible elements being adapted to engage with one of the first slots by a first lug.

4. The fast coupling according to claim 3, wherein each second flexible element is provided with a second lug adapted to engage with a second slot made on the first body in a housing of each first flexible element; said engagement occurring simultaneously with a radial shrinkage of the torus-shaped elastic element caused by the thrust of a circumferential shoulder integral with the first body.

5. The fast coupling according to claim 4, wherein the torus-shaped elastic element is received in an inner part of the second body having a hemispherical cross-section; said cross-section tapering towards the end of said second body that is provided with an opening adapted to receive an end of the male connector.

6. The fast coupling according to claim 5, wherein the torus-shaped elastic element is located inside the second body in a housing defined by the inner part (12), a circumferential shoulder, and the outer surface of the end of said second body provided with the opening.

7. The fast coupling according to claim 6, wherein the torus-shaped elastic element is located inside the housing so that said elastic element is forced to radially shrink when said second body is completely inside the first body and the male connector is connected to the fast coupling; said male connector being locked because said radial shrinkage exerts a thrust around its outer surface.

8. The fast coupling according to claim 6, wherein when the male connector is locked inside the second body, the outer surface of the second flexible elements contacts a part of the inner surface of the first flexible elements by a portion;

said contact allowing the disconnection of said second lugs from the respective second slots by pressing said first flexible elements.

9. The fast coupling according to claim 5, wherein when said fast coupling is in the operative state, the second body and the first body are reciprocally connected by the engagement of the third flexible elements with respective first slots after the second body is pressed inside the first body; said connection allowing to lock and unlock the male connector in and from said second body.

* * * * *